United States Patent [19]

Shirley

[11] Patent Number: 5,074,170
[45] Date of Patent: Dec. 24, 1991

[54] LUG NUT TOOL

[76] Inventor: David B. Shirley, 2245 Washington Rd., Washington, Ill. 61571

[21] Appl. No.: 657,142

[22] Filed: Feb. 19, 1991

[51] Int. Cl.⁵ .......................................... B25B 17/00
[52] U.S. Cl. ................................. 81/57.3; 81/57.22; 81/462; 81/57.36; 71/665 GA; 71/606 R
[58] Field of Search ............... 81/57.3, 462, 57.22, 81/57.36, 57.24, 57.25, 57.4, 57.41, 58.1; 74/665 GA, 606 R

[56] References Cited

U.S. PATENT DOCUMENTS

| | | | |
|---|---|---|---|
| 1,415,916 | 5/1922 | Barton | 81/57.22 |
| 3,905,254 | 9/1975 | Palatnick et al. | 81/57.3 |
| 4,063,475 | 12/1977 | Perkins | 81/57.3 X |
| 4,620,462 | 11/1986 | Parker | 81/462 |
| 4,630,511 | 12/1986 | Shirley | 81/462 |

FOREIGN PATENT DOCUMENTS

| | | | |
|---|---|---|---|
| 329612 | 9/1935 | Italy | 81/57.3 |
| 553713 | 1/1957 | Italy | 81/57.3 |

Primary Examiner—D. S. Meislin
Attorney, Agent, or Firm—Leon Gilden

[57] ABSTRACT

A tool construction is set forth to include a central housing and a plurality of radially directed housing legs relative to the housing, wherein each leg mounts an output shaft driven through a central gear to effect simultaneous removal or assembly of lug nuts relative to an associated vehicular wheel.

2 Claims, 4 Drawing Sheets

PRIOR ART

LUG NUT TOOL

BACKGROUND OF THE INVENTION

1. Field of the Invention

The field of invention relates to lug nut tool construction, and more particularly pertains to a new and improved lug nut tool wherein the same permits simultaneous removal and assembly of lug nuts relative to an associated wheel, with an output shaft relative to the housing associated with each lug nut.

2. Description of the Prior Art

The assembly and removal of lug nuts, particularly in commercial environments specializing in tire and wheel assembly, requires a loss of time and effort in assembling each individual lug nut relative to an associated wheel. Examples of such prior art tools may be found U.S. Pat. No. 4,063,475 to Perkins wherein a lug nut tool is arranged, wherein a transmission gearing or direct drive gearing is provided within a single housing for removal of individual lug nuts.

U.S. Pat. No. 4,630,511 to Shirley sets forth a positioning jig for supporting a lug nut Wrench When removing the lug nuts from an associated wheel of a dual wheel tire assembly.

U.S. Pat. No. 4,620,462 to Parker sets forth a tool for removing truck lug nuts, wherein a support stand mounts a torque shaft, with the torque shaft mounted to a lug nut rod and socket for enhanced application of torque for removal of the lug nut of an associated wheel.

As such, it may be appreciated that there continues to be a need for a new and improved lug nut tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of lug nut tool construction now present in the prior art, the present invention provides a lug nut tool wherein the same utilizes a single unitary housing for permitting simultaneous application and removal of lug nuts relative to an associated wheel structure. As such, the general purpose of the present invention, which will be described subsequently in greater detail, is to provide a new and improved lug nut tool which has all the advantages of the prior art lug nut tools and none of the disadvantages.

To attain this, the present invention provides a tool construction to include a central housing and a plurality of radially directed housing legs relative to the housing, wherein each leg mounts an output shaft driven through a central gear to effect simultaneous removal or assembly of lug nuts relative to an associated vehicular wheel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal term or phraseology, to determine quickly from a cursory inspection the nature and essence of the technical disclosure of the application. The abstract is neither intended to define the invention of the application, Which is measured by the claims, nor is it intended to be limiting as to the scope of the invention in any way.

It is therefore an object of the present invention to provide a new and improved lug nut tool which has all the advantages of the prior art lug nut tools and none of the disadvantages.

It is another object of the present invention to provide a new and improved lug nut tool which may be easily and efficiently manufactured and marketed.

It is a further object of the present invention to provide a new and improved lug nut tool which is of a durable and reliable construction.

An even further object of the present invention is to provide a new and improved lug nut tool which is susceptible of a low cost of manufacture with regard to both materials and labor, and which accordingly is then susceptible of low prices of sale to the consuming public, thereby making such lug nut tools economically available to the buying public.

Still yet another object of the present invention is to provide a new and improved lug nut tool which provides in the apparatuses and methods of the prior art some of the advantages thereof, while simultaneously overcoming some of the disadvantages normally associated therewith.

Still another object of the present invention is to provide a new and improved lug nut tool wherein the same permits unitary mounting for simultaneous assembly and disassembly of individual lug nuts relative to an associated wheel.

These together with other objects of the invention, along with the various features of novelty which characterize the invention, are pointed out With particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
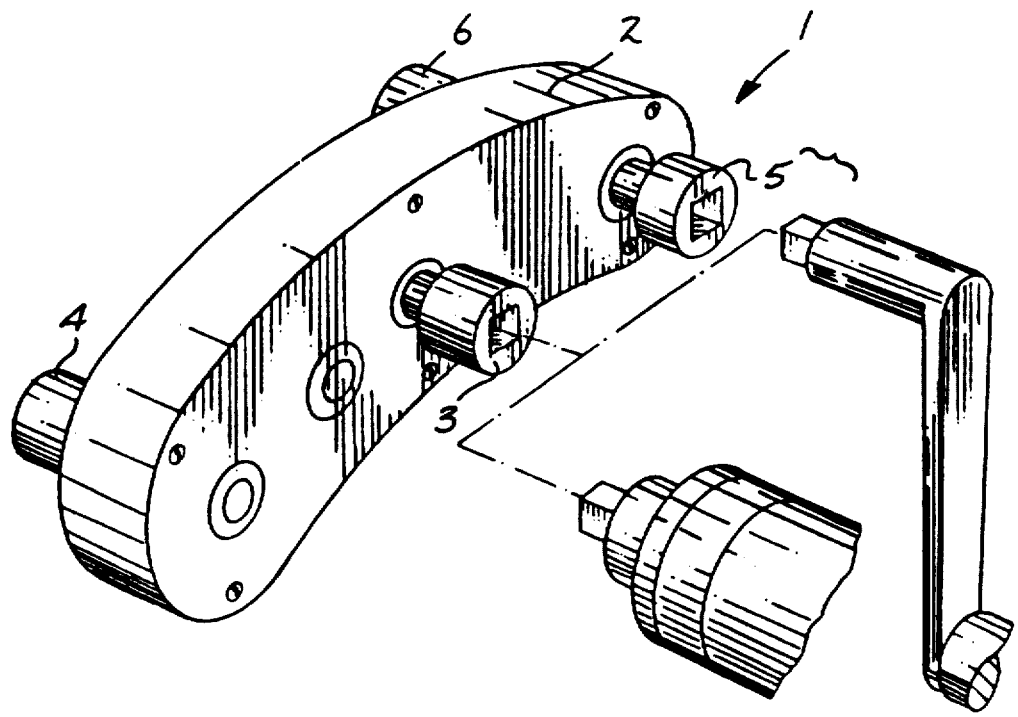
FIG. 1 is an isometric illustration of a prior art lug nut tool apparatus.

With reference now to the drawings, and in particular to FIGS. 1 to 5 thereof, a new and improved lug nut tool embodying the principles and concepts of the present invention and generally designated by the reference numeral 10 will be described.

Figure 2:
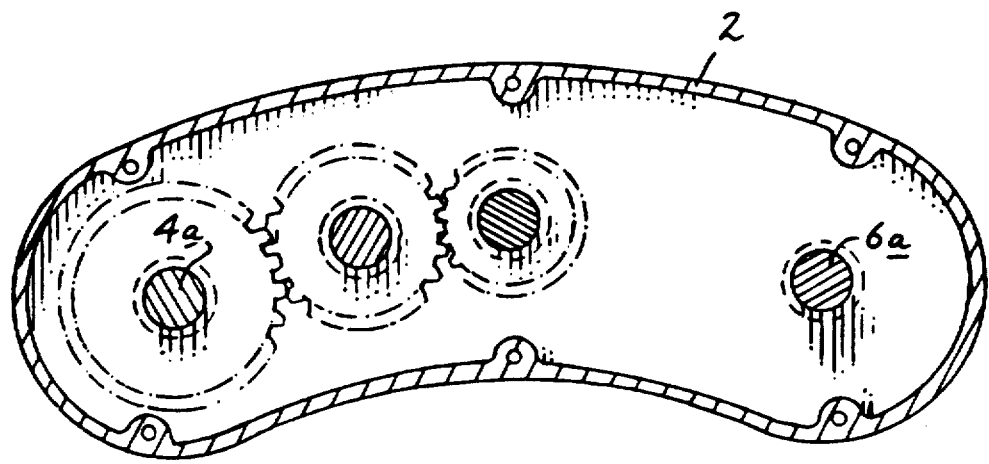
FIG. 2 is an orthographic cross-sectional illustration of the prior art lug nut tool as set forth in FIG. 1.

FIG. 1 illustrates a prior art lug nut tool, as set forth in U.S. Pat. No. 4,063,475, wherein a central housing 2 includes a first drive receiving socket 3 to direct a multiplication of force to a first lug nut socket 4, wherein a further torque receiving socket 5 provides direct association with a second drive socket 6, as illustrated in FIG. 2 per the lug nut socket shafts 4a and 6a respectively.

Figure 3:
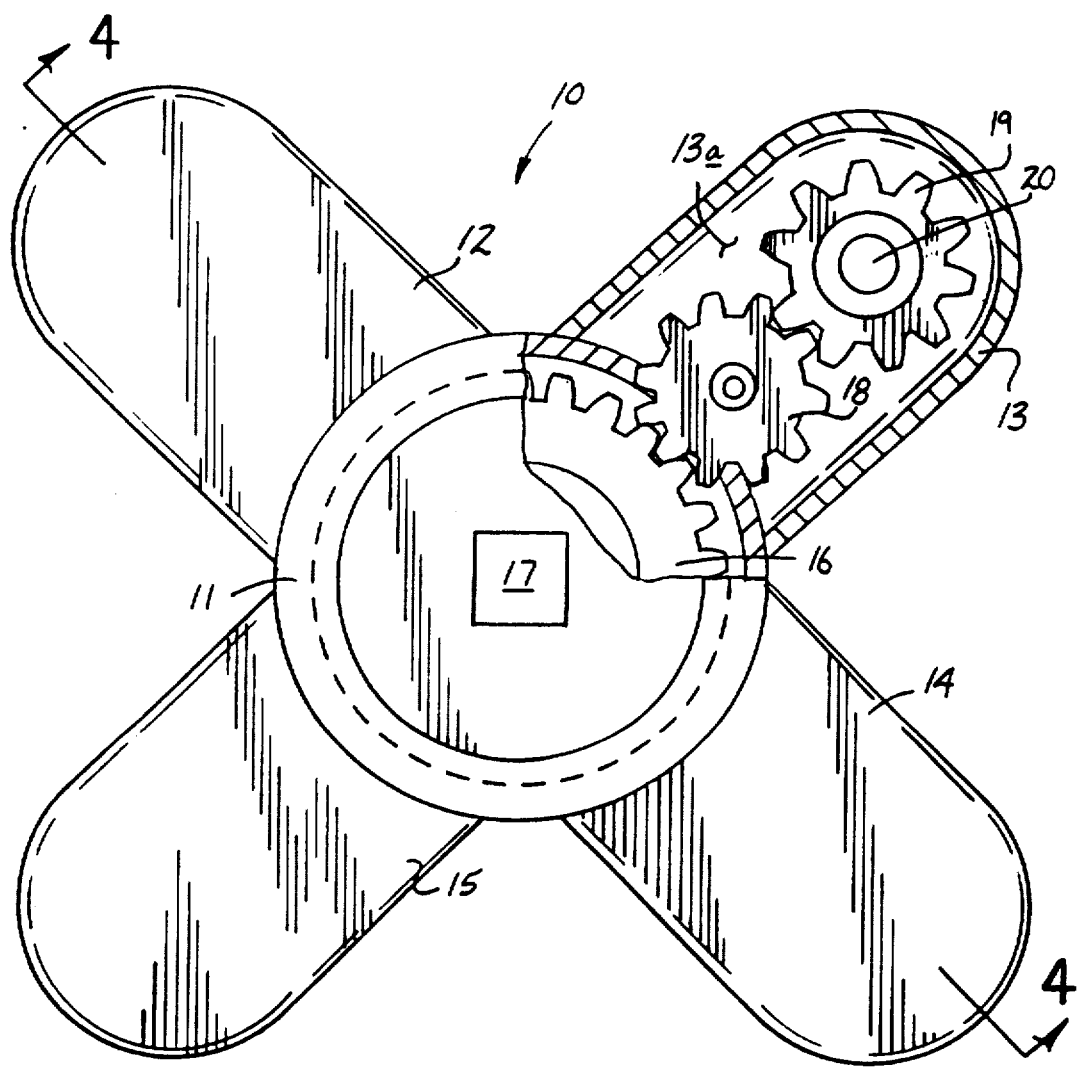
FIG. 3 is a top orthographic view, partially in section, of the lug nut tool construction of the instant invention.
Figure 4:
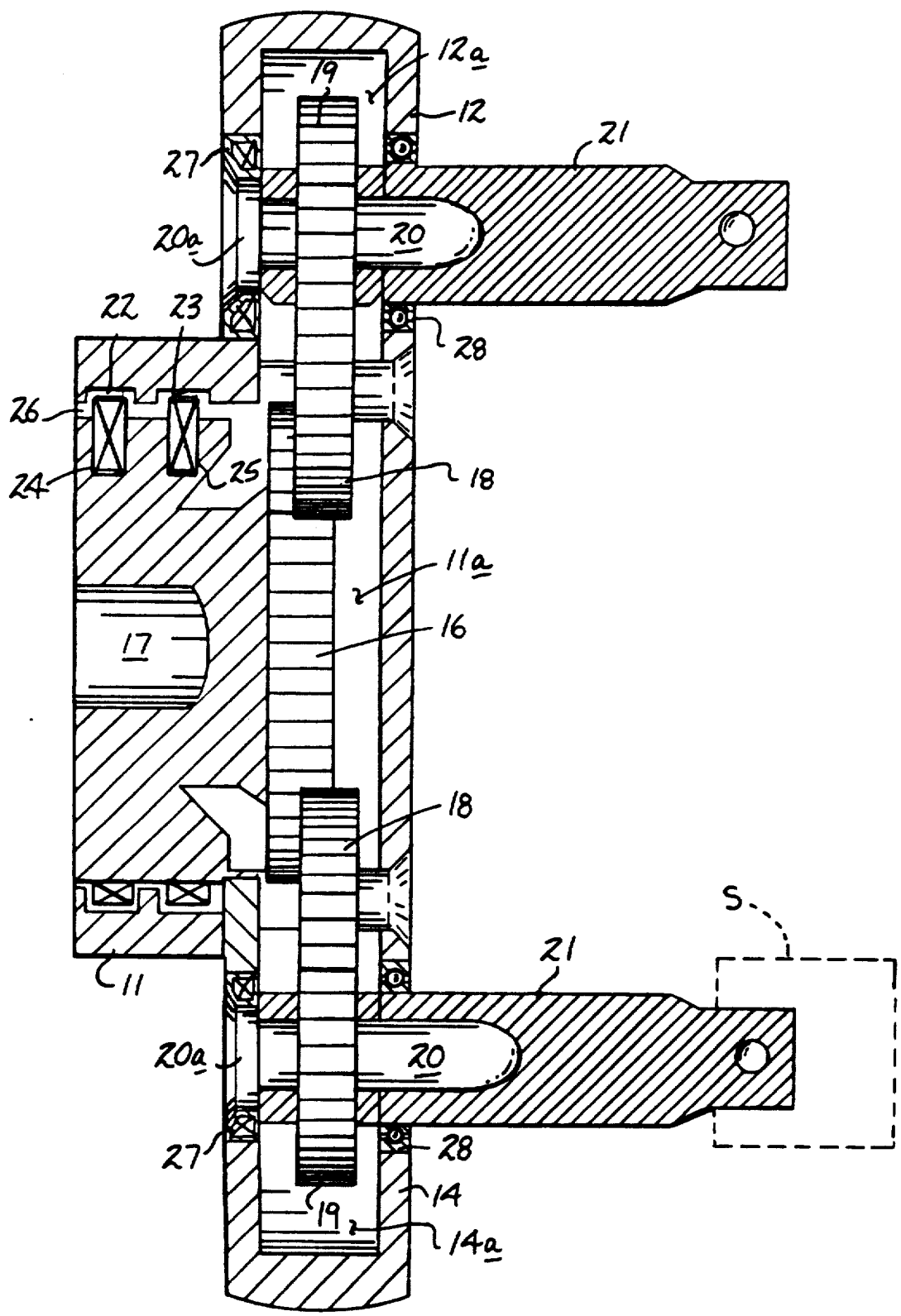
FIG. 4 is an orthographic cross-sectional illustration of the lug nut tool, extending along the lines 4—4 of FIG. 3 in the direction indicated by the arrows.
Figure 5:
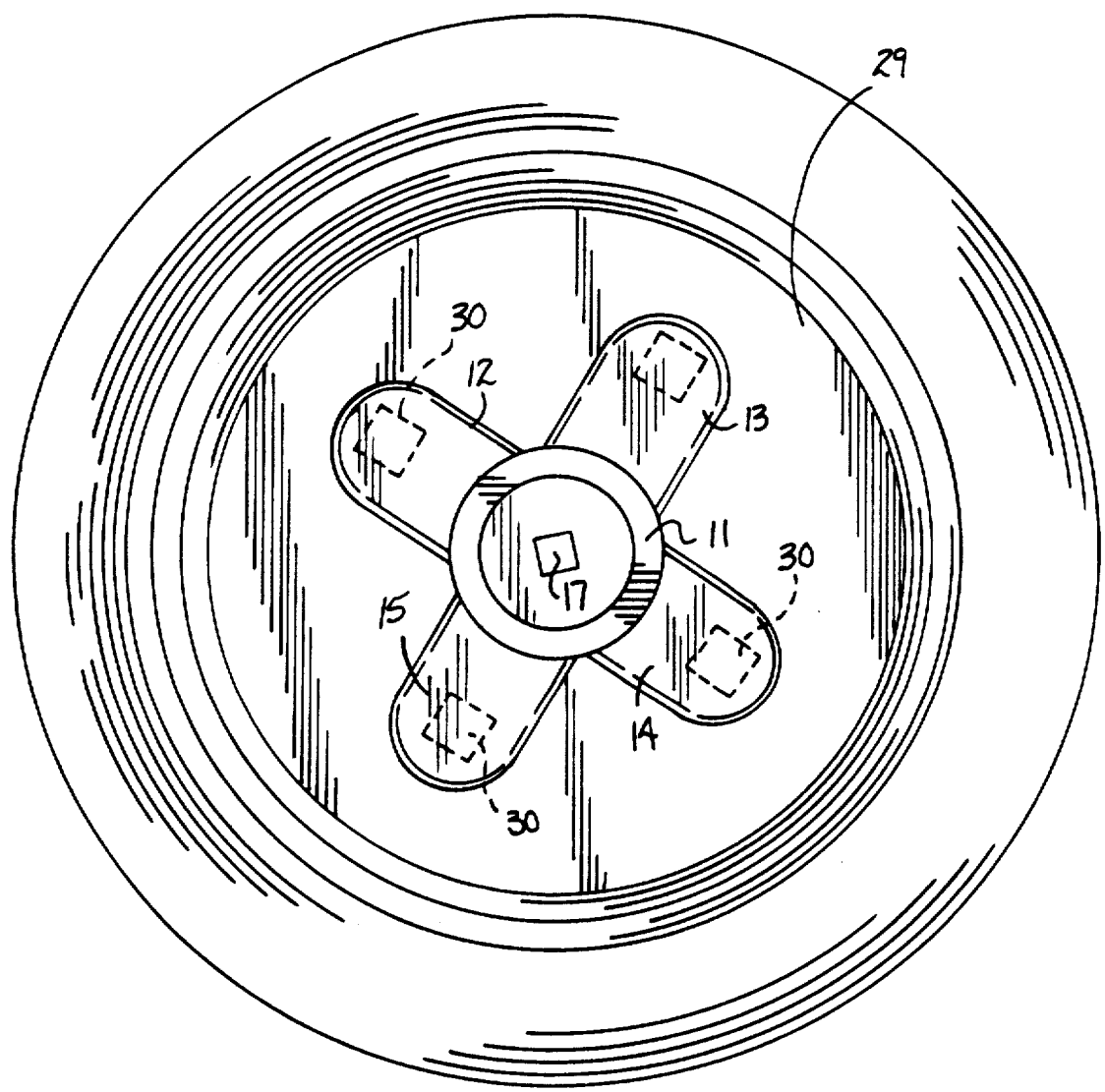
FIG. 5 is an orthographic view, taken in elevation, of the lug nut tool of the instant invention mounted to an associated wheel.

More specifically, the lug nut tool 10 of the instant invention essentially comprises a unitary housing including a central housing hub 11, with a plurality of radially extending housing legs defined by a first, second, third, and fourth housing leg 12, 13, 14, and 15 respectively. The housing legs are oriented within a single circular array, as illustrated in FIG. 3. It should be noted that each housing leg is associated with a respective vehicular wheel lug nut 30 of an associated vehicular wheel 29 (see FIG. 5 for example). In this manner, should a five-bolt pattern or six-bolt pattern, etc. be utilized, a housing leg will be provided in a further orientation relative to each lug nut 30. A central drive gear 16 is mounted within the central housing hub 11 coaxially thereof, with the central drive gear socket 17 extending coaxially of and exteriorly of the top surface of the central housing hub 11 to receive a drive tool either utilized by a mechanical type tool, as illustrated by the prior art FIG. 1, or a pneumatic or hydraulic actuated tool utilizing a standard drive stub.

An intermediate gear 18 rotatably mounted within each housing leg is in operative association with the central drive gear 16. The intermediate gear 18 provides use of torque multiplication as required, and permits spacing of each terminal gear 19 relative to the central drive gear 16. Spacing of each terminal gear 19 provides for proper positioning of each terminal gear relative to the central drive gear 16. Each terminal gear 19 is rotatably mounted about a terminal gear shaft 20, wherein each terminal gear shaft 20 includes an outwardly directed flared head 20a mounted to a top surface of each housing leg to properly mount each terminal gear shaft and prevent projection of each terminal gear shaft relative to an output shaft 21. The output shaft of each terminal gear shaft 20 is orthogonally mounted relative to each housing leg and is coaxially directed relative to each terminal gear shaft 20. Projection of each output shaft 21 relative to each housing leg provides clearance for various projections within a wheel, such as the wheel central hub and the like. Further, each flared head 28 mounts an output shaft upper head bearing 27 thereabout, with an output shaft lower bearing 28 mounted to a lower surface of each housing leg. The central drive gear 16 includes a first and second circumferential housing groove 22 and 23 mounted within an interior surface of the housing hub 11, wherein each circumferential groove is spaced relative to the other and each mounting a respective first and second bearing 24 and 25. A cylindrical slot 26 intercommunicates the first and second bearings 24 and 25 mounted within a respective first and second housing groove 22 and 23 to provide access of lubricant to each of the first and second bearings through the cylindrical slot 26. In use, a socket "S" is mounted to each outer terminal end of each output shaft 21 and wherein each socket is positioned upon an associated lug nut 30.

It should be further noted that the radial array of the housing legs 12 relative to the central hub centers the tool structure 10 relative to an associated vehicular wheel 29 preventing torquing or relative rotation of the tool 10 relative to the wheel, as opposed to prior art devices requiring external stabilizing means.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters patent of the United States is as follows:

1. A lug nut tool in combination with a vehicular wheel, wherein the vehicular wheel includes a plurality of lug nuts radially spaced in a predetermined circle respective to an axis of the vehicular wheel, and the tool including a central housing hub, and the housing hub including a predetermined plurality of housing legs radially and fixedly mounted to the housing hub, and the housing hub including a central drive gear, wherein the central drive gear includes a coaxially mounted drive gear socket for receiving a torque application tool, wherein each of the predetermined pluralities of housing legs includes an intermediate gear in association with the central drive gear, and a terminal gear mounted within each housing leg in operative association with each intermediate gear, and an output shaft coaxially mounted to each intermediate gear extending orthogonally and exteriorly of a bottom surface of each housing leg, wherein each output shaft selectively receives a socket for mounting onto an associated lug nut, and wherein each output shaft is coaxially and fixedly mounted to a terminal gear shaft, wherein the terminal gear shaft is fixedly mounted to each terminal gear and is rotatably mounted within each housing leg orthogonal relative to each housing leg, and an upper terminal end of each terminal gear shaft includes an outwardly flared head cooperative with an upper head bearing, and a lower terminal end of each terminal gear shaft rotatably mounted within a lower head bearing.

2. An apparatus as set forth in claim 1 wherein the central housing hub includes a first and second circumferential groove formed to an interior surface of the housing hub, wherein the circumferential grooves are arranged in a parallel relationship relative to one another and coaxially aligned relative to the housing hub, and the first and second groove mount a respective first and second bearing therewithin, and a cylindrical slot is in communication with the first and second bearing to permit lubrication of the first and second bearing through the cylindrical slot positioned between the central drive gear socket and the housing hub.

* * * * *